United States Patent [19]

Weinberger et al.

[11] Patent Number: 5,582,690
[45] Date of Patent: Dec. 10, 1996

[54] METHOD OF AND MEANS FOR WATER DESALINIZATION

[75] Inventors: Joseph Weinberger, Netanya; Uriyel Fisher, Haifa; Gad Assaf, Rehovot; Benjamin Doron, Jerusalem, all of Israel

[73] Assignee: Ormat Turbines (1965) Ltd., Yavne, Israel

[21] Appl. No.: 7,031

[22] Filed: Jan. 21, 1993

Related U.S. Application Data

[63] Continuation of Ser. No. 745,231, Aug. 14, 1991, abandoned, which is a continuation of Ser. No. 443,683, Nov. 29, 1989, abandoned, which is a continuation of Ser. No. 128,824, Dec. 4, 1987, Pat. No. 4,894,993.

[51] Int. Cl.$^6$ ................ B01D 1/26; B01D 3/06
[52] U.S. Cl. ........... 203/10; 60/641.9; 60/641.2; 159/2.1; 159/17.1; 159/23; 159/903; 159/DIG. 8; 202/174; 202/186; 202/234; 202/235; 203/22; 203/27; 203/87; 203/88; 203/DIG. 1; 203/DIG. 17
[58] Field of Search ................ 202/186, 234, 202/174, 235; 159/DIG. 8, 2.1, 903, 17.1, 23, DIG. 32; 203/10, 27, DIG. 8, DIG. 17, DIG. 1, 11, 87, 88, 22; 60/641.2, 641.8, 641.9

[56] References Cited

U.S. PATENT DOCUMENTS

| | | | |
|---|---|---|---|
| 2,181,731 | 11/1939 | Hinckley | 159/20.1 |
| 2,734,565 | 2/1956 | Lockman | 159/20.2 |
| 2,796,120 | 6/1957 | Lockman et al. | 159/20.2 |
| 3,021,265 | 2/1962 | Sadtler et al. | 159/DIG. 8 |
| 3,093,553 | 6/1963 | Ramen | 159/20.2 |
| 3,286,764 | 11/1966 | Mojonnier et al. | 159/17.2 |
| 3,289,735 | 12/1966 | Rosenblace | 159/20.2 |
| 3,303,106 | 2/1967 | Standiford | 159/17.4 |
| 3,334,023 | 8/1967 | Fritz | 159/20.1 |
| 3,351,120 | 11/1967 | Goeldner et al. | 159/DIG. 8 |
| 3,402,106 | 9/1968 | Spray | 202/174 |
| 3,672,960 | 6/1972 | Kays | 159/17.3 |
| 3,839,160 | 10/1974 | Izumi | 159/DIG. 8 |
| 3,849,259 | 11/1974 | Steinbruchel | 159/DIG. 8 |
| 3,868,308 | 2/1975 | Barak et al. | 202/174 |
| 3,951,753 | 4/1976 | Roller | 202/174 |

(List continued on next page.)

FOREIGN PATENT DOCUMENTS

| | | | |
|---|---|---|---|
| 67054 | 8/1982 | Israel . | |
| 4176382 | 6/1992 | Japan | 202/174 |
| 333547 | 8/1930 | United Kingdom | 159/17.2 |

OTHER PUBLICATIONS

U. Fisher, "One Year of Operation of Israel Desalination Engineering's Multi-effect Distillation U.S. Virgin Islands", *Desalination*, 44 (1983), Elsevier Science Publishers B.V., Amsterdam, The Netherlands, pp. 73–84.

*Primary Examiner*—Virginia Manoharan
*Attorney, Agent, or Firm*—Donald M. Sandler

[57] ABSTRACT

Desalination of sea water is achieved using a solar pond that includes a halocline interposed between a convective upper wind mixed layer exposed to the ambient atmosphere, and a lower heat storage layer of hot, concentrated brine. Hot brine from the heat storage layer is flashed into steam which is condensed into desalted water using an indirect heat exchanger cooled by saline water. The latent heat of condensation of the steam warms the saline water and effects evaporation of water therefrom in the form of vapor. The last mentioned water vapor is condensed into desalted water using a two-stage condenser, the first stage of which is an indirect heat exchanger cooled by saline feed water which is heated as a result producing warmed saline feed water that constitutes the saline water used for condensing the steam produced by flashing the brine from the heat storage layer of the pond. The major part of the water vapor is condensed into desalted water in a second stage of the condenser that utilizes an indirect heat exchanger cooled by cooling water from the wind-mixed layer of the solar pond. The major portion of the warmed cooling water leaving the second stage of the condenser are returned to the wind-mixed layer of the solar pond.

26 Claims, 3 Drawing Sheets

U.S. PATENT DOCUMENTS

| | | | |
|---|---|---|---|
| 4,211,613 | 7/1980 | Meckler | 203/DIG. 1 |
| 4,330,373 | 5/1982 | Liu | 159/DIG. 8 |
| 4,440,148 | 4/1984 | Assaf . | |
| 4,498,300 | 2/1985 | Assaf et al. | 60/641.8 |
| 4,676,870 | 6/1987 | Stewart et al. | 202/174 |
| 4,755,258 | 7/1988 | Ryham | 159/DIG. 8 |
| 4,756,797 | 7/1988 | Elmore et al. | 159/DIG. 8 |

5,582,690

METHOD OF AND MEANS FOR WATER DESALINIZATION

RELATED APPLICATION

This application is a continuation of application Ser. No. 745,231 filed Aug. 14, 1991 (now abandoned); which is a continuation of application Ser. No. 07/443,683, filed Nov. 29, 1989 (now abandoned); which is a continuation of application Ser. No. 07/128,824, filed Dec. 4, 1987 U.S. Pat. No. 4,8894,993.

TECHNICAL FIELD

This invention relates to a method and means for water desalination, and particularly to a system that utilizes a salt water solar pond.

BACKGROUND OF THE INVENTION

The importance of desalination techniques to supplement naturally available fresh water for increased residential, industrial, and farming applications throughout the world is well-known. To reduce energy consumption, and thus reduce the cost to produce fresh water, the use of heat contained in a solar pond has been suggested. One approach is disclosed in Israeli Patent No. 67054 which utilizes a flash evaporator operating on hot brine removed from the heat storage layer of a salt water solar pond. As is well-known, a salt water solar pond is a body of water in which a halocline is interposed between a convective upper wind-mixed layer of saline water (i.e., water whose salinity is between about 1 % and 5 %) exposed to the ambient atmosphere, and a lower heat storage layer of concentrated brine. The salinity profile through the halocline increases in a downward direction with a result that the halocline is non-convective and serves as a collector of solar radiation and as an active insulator for the underlying heat storage layer which is heated by direct absorption of solar radiation and by conduction from the halocline.

In Israeli Patent No. 67054, the brine from the heat storage layer is flashed into steam which is then condensed into desalted water in an indirect contact heat exchanger cooled by sea water. The sea water is heated by the condensing steam, and then sprayed over an evaporation pond thus enhancing the evaporation of water from the sea water and increasing the concentration of the brine that collects in the evaporation pond. Concentrated brine from this pond is pumped into the heat storage layer of the salt water solar pond at one end thereof to replace the brine that is removed from the heat storage layer at the other end of the pond, and that is added to the flash evaporator. During its traverse from one end of the pond to the other, the brine is heated by solar radiation.

A major problem with this approach is the inherent instability of the solar pond because of the regular replacement of concentrated brine in the heat storage layer of the pond with fresher water. This creates what is termed a "falling" solar pond. Another problem is that all of the desalted water produced is derived from the heat storage layer; and thus, the production of desalted water is limited.

U.S. Pat. No. 3,868,308 discloses a multi-effect evaporator in which steam from an external source is condensed to desalted water in an indirect contact heat exchanger that is cooled by sea water. Some of the sea water is converted to a vapor by heat exchange process, and this vapor is applied to a succeeding effect which is also cooled by sea water, etc. No specific apparatus is shown or described dealing with condensing the output of the last effect, and no source for steam is shown or suggested. It would be desirable to utilize a salt water solar pond as a source of steam, but the configuration shown in the 1308 patent is not conducive to this particularly because of problems in maintaining the stability of the pond in the face of the withdrawal of hot brine from the pond.

It is, therefore, an object of the present invention to provide a new and improved method of a means for water desalination using a salt water solar pond which overcomes many of the problems of the prior art.

BRIEF DESCRIPTION OF THE INVENTION

According to the present invention, desalination is achieved using heat from a solar pond that includes a halocline interposed between a convective upper wind mixed layer exposed to the ambient atmosphere, and a lower heat storage layer of hot concentrated brine. Hot brine from the heat storage is flashed into steam which is condensed into desalted water using an evaporator cooled by saline water which is warmed and produces additional water vapor and warmed brine. Preferably, the evaporator is a multi-effect type in the form of a plurality or train of heat exchangers in which vapor produced by a preceding heat exchanger, or effect, in the train is condensed in the succeeding effect.

The additional water vapor is condensed into desalted water using a two-stage condenser to which the additional water vapor is applied in parallel. The first stage of the condenser is cooled by saline feed water which is heated as a result producing warmed saline water that constitutes the saline water that cools the evaporator; and the second stage of the condenser is cooled by cooling water for producing warmed cooling water. Preferably, the cooling water is drawn from the wind-mixed layer of the solar pond; and portions of the warmed cooling water produced by the second stage of the condenser, and of the warmed saline water produced by the evaporator are disposed of, preferably after exchanging heat in these waters with the saline feed water.

In this manner, a portion of the desalted water produced in the manner described above is derived from the heat storage layer of the solar pond, but the major portion is derived from the saline feed water, which may be ocean or sea water. The brine from the solar pond supplying this desalted water contains sufficient heat to provide the energy required to complete the desalination process. Additionally, cooling the second stage of the condenser with water from the wind-mixed layer, reduces the amount of saline feed water required to be pumped to the desalination apparatus which is important for installations remote from the ocean or sea.

BRIEF DESCRIPTION OF THE DRAWINGS

An embodiment of the present invention is described by way of example with reference to the accompanying drawings wherein.

DETAILED DESCRIPTION

Figure 1:
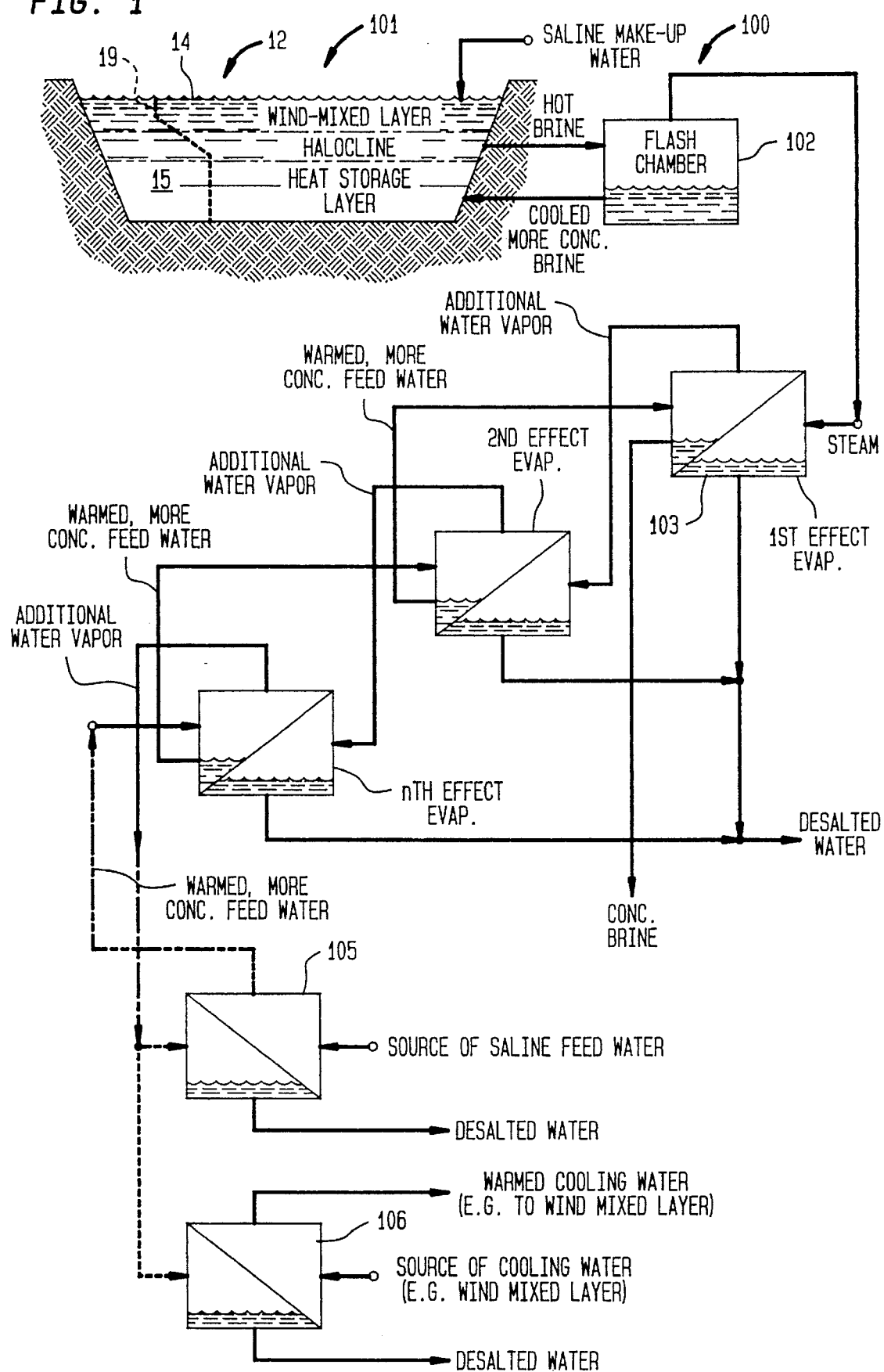
FIG. 1 is a simplified block diagram of a desalination plant according to the present invention.

Referring now to the drawings, reference numeral 100 in FIG. 1 designates a desalination plant according to the present invention comprising solar pond 101, flash chamber 102, evaporator 103, and condenser 104 comprising first stage condenser 105 and second stage condenser 106. Apparatus 100 utilizes salt water solar pond 12 which includes halocline 13 interposed between upper, convective wind-mixed layer 14 exposed to ambient atmosphere, and lower heat storage layer 15 containing concentrated brine. As is well known, halocline 13 is non-convective, and has a density gradient that increases in the downward direction, this gradient being established by a downwardly increasing salt concentration as indicated by salinity profile line 19. By reason of the downwardly increasing density, heat absorbed in a stratum of the halocline due to solar radiation incident on the solar pond is unable to decrease the density of the stratum to a value less than the density of the overlying stratum with the result that the water in the heated stratum does not become buoyant and is thus non-convective. Moreover, a temperature profile is developed in the halocline which increases in a downward direction. Eventually, the concentrated brine below the halocline is heated by direct absorption of solar radiation as well as by conduction from the halocline. When suitable salts are involved, the temperature of the brine in the heat storage layer can exceed 100° C.

The wind-mixed layer at the surface of the solar pond is convective and is generally saline water with a salinity of 1–5% the salinity of the halocline increasing from around 1–5% at the top to over 30% at the bottom. The thickness or depth of the halocline is usually about 1 meter, and the thickness of the wind-mixed layer is dynamic and averages about 0.5 meters depending upon atmospheric conditions such as wind, rain, etc. Finally, the heat storage layer has a constant salinity of around 30%. Its depth is dependent upon the desired capacity of the system taking into account the amount of solar radiation, and the rate at which water is to be withdrawn from the heat storage layer (i.e., the annual production rate of the desalination apparatus).

Solar radiation incident on the surface of the pond penetrates into the pond and is absorbed by the various layers. Over a long period time, the heat storage layer is heated, and a large volume of water of heated brine is achieved. The temperature profile through the pond usually has a shape similar to the salinity profile shown at 19.

Typically, solar ponds are constructed using brines such as chlorides and sulfates of sodium, calcium, and magnesium to provide the requisite concentrations for the heat storage layer. Preferably, such brines comprise highly soluble salts whose solubility does not decrease with temperature.

The operation of the apparatus shown in FIG. 1 is now explained. Hot brine from solar pond 12 is pumped into flash chamber 102 where the reduced pressure causes water in the brine to flash into steam, reducing the temperature of the remaining brine which is more concentrated as a result. The cooled and more concentrated brine is returned to heat storage layer 15. The volume content of the pond can be maintained by mixing with the returned, more concentrated brine, saline water, such as water from the wind-mixed layer, or a part of the heated saline water exiting from the desalination effects, or sea water, until the flow rate and concentration of the returned brine matches the brine previously removed from the heat storage layer. By using concentrated brine produced by the first effect in the chain of effects of the desalination plant for replacement water in the heat storage layer (see pipe 20 in FIG. 2), an amount of salt in excess of the amount diffused to the upper layers of the pond is added to the heat storage layer. This produces a rising solar pond which is very stable and easy to maintain (see U.S. Pat. No. 4,440,148 issued Apr. 3, 1984). Moreover, the excess salinity in the heat storage layer serves to increase the salinity gradient in the halocline, and thus helps reduce the thickness of the upper wind-mixed layer which makes for a highly efficient pond.

Steam produced in the flash chamber is piped to evaporator 103 which is an indirect heat exchanger that preferably includes bundles of tubes. The steam from the flash chamber flows through the tubes, and the saline water flows on the outer surface of the tubes, preferably in a thin film to enhance heat transfer. Typically, the saline water is sea water; but the term "saline water" is used in this description with a broader meaning, and is intended to include, among other things, salt solutions as well as brines. The arrangement shown in FIG. 1 is well suited to using a brine as the coolant for the evaporator as will be evident in the further description of the operation of FIG. 1.

As a result of the heat exchange process effected in the evaporator, the steam from the flash chamber condenses into fresh water which, in this description, is termed desalted water that represents a portion of the total product produced by the apparatus. The saline water in the evaporator is warmed as a result, and some of the saline water evaporates producing additional water vapor that is segregated from the remaining liquid which may be disposed of.

The additional water vapor produced from the coolant supplied to the evaporator is directed to condenser 104 which, preferably comprises a two stages as illustrated in FIG. 1 as stage 105 and stage 106. Stage 105 is cooled by saline feed water, and stage 106 is cooled by another source of cooling water. The additional water vapor is applied to the stages of the condenser in parallel, and the condensation of this vapor in the condenser produces desalted water which can be combined with that produced by the evaporator forming the total product of the apparatus. As described below, the major portion of the desalted water product produced by the apparatus of the invention is derived from the the saline feed water.

Saline feed water, e.g., sea water, is applied to stage 105 of the condenser, and this feed water is warmed by the heat absorbed from that portion of the additional water vapor applied to this stage producing warmed saline feed water that is the coolant for evaporator 103. It should be noted that the warmed saline water returned to the evaporator will be cooler than the steam produced by flash chamber 102.

Cooling water, e.g., sea water, but preferably water from the wind-mixed layer of the solar pond, is applied to stage 106 of the condenser. The cooling water is warmed by the heat absorbed from that portion of the additional water vapor applied to this stage producing warmed cooling water that is disposed of. Where the apparatus of the invention is located remote from an ocean or other source of sea water requiring significant transportation of sea the water to the desalination plant, the use of water from the wind-mixed layer is preferred because this reduces the flow of sea water to and from the apparatus.

Finally, to maintain the level of liquid in the pond, saline make-up water, e.g., sea water, is supplied to the wind-mixed layer of the pond.

As can be seen from FIG. 1, only a portion of the desalted water produced by apparatus 100 is derived from the solar pond. The major part of the desalted water or product is derived from the saline feed water used in evaporator 103 and condenser 104.

Figures 2, 3:
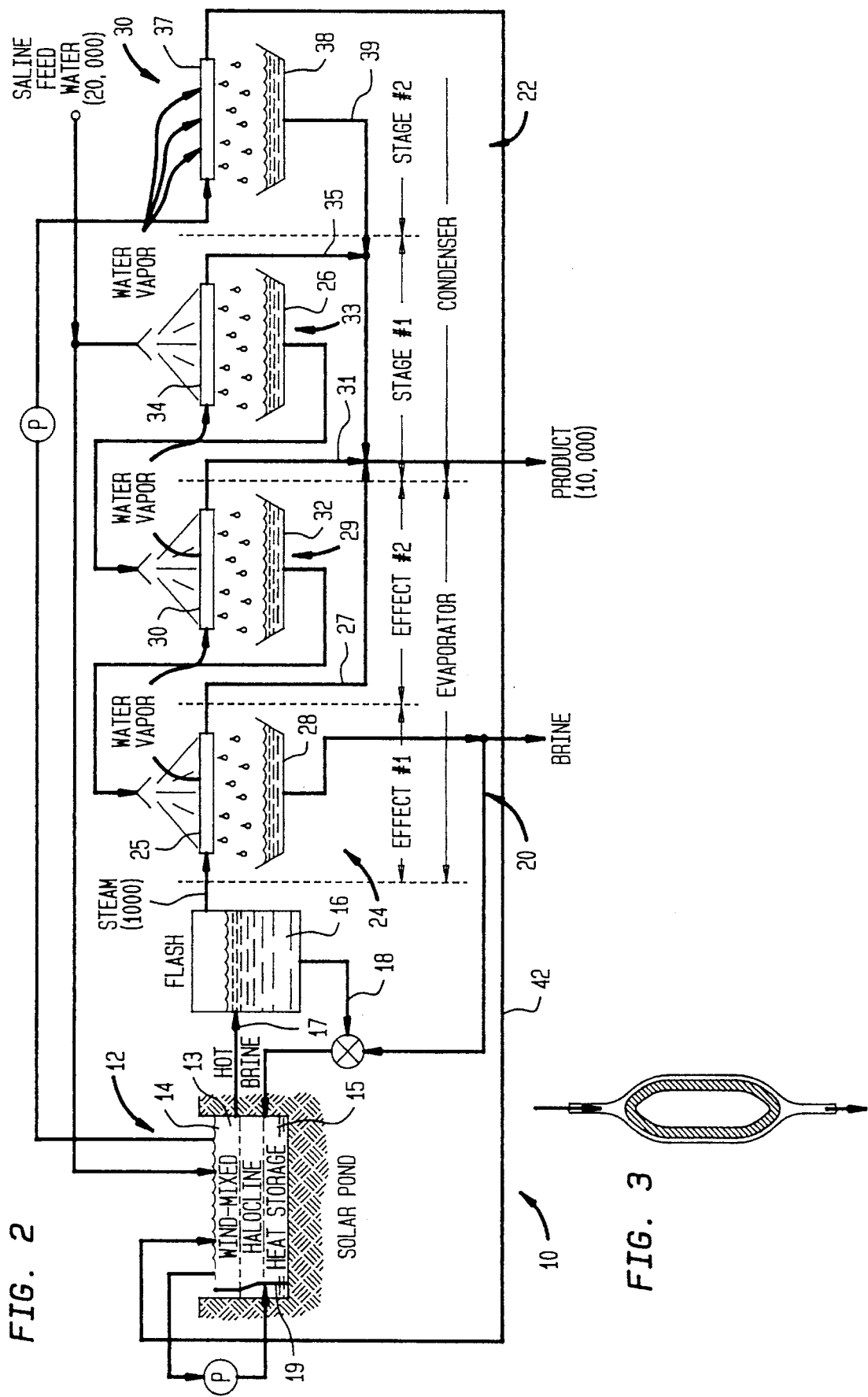
FIG. 2 is a schematic diagram of a desalination plant according to the present invention.
FIG. 3 is a cross sectional view of a heat exchange tube such as could be used in the arrangement shown in FIG. 2.

In constructing an actual desalination plant, the configuration shown schematically in FIG. 2 can be utilized wherein reference numeral 10 represents apparatus for desalinating saline water such as sea water. Apparatus 10 also includes flash chamber 16 which is a chamber that is usually held below equilibrium pressure of the incoming hot brine from the heat storage layer of solar pond 12. As indicated in FIG. 2, brine substantially close to, but below, the interface between the halocline and the storage layer is pumped via conduit 17 into flash chamber 16, and brine from the flash chamber is pumped via conduit 18 back into the heat storage layer at a lower level where the temperature of heat storage layer matches the temperature of the brine returned from the flash chamber. The difference between the mass flow of brine from the heat storage layer into the flash chamber, and the mass flow of brine out of the flash chamber back into the heat storage layer of the solar pond is equal to the mass flow of steam produced by the flash chamber. This mass flow difference must be replenished to maintain the volume of the solar pond; and this is provided for as explained below.

Apparatus 10 also includes evaporator section 20 and condenser section 22. Preferably, the evaporator includes multiple effects each of which incorporates a plurality of units, and the condenser may comprise one or two stages. First effect 24 of the evaporator includes an indirect heat exchanger in the form of a plurality of tube bundles whose tubes are diagramatically indicated by reference numeral 25. Steam produced by flash chamber 16 is applied to the inside of tubes 25 and flows inside these tubes. The steam inside the tubes is condensed by the application to the outside of the tubes of a spray of saline water which flows as a thin film on the outside of tubes 25. Thus, effect 24 is responsive to steam from flash chamber 16 and to saline water for condensing the steam into liquid water which flows into conduit 27 and which constitutes desalted water which is the product produced by the desalination process. The saline water flowing as a film on the outside of tubes 25 is warmed by the latent heat of condensation of the steam in the tubes, and water is evaporated from the saline water into the shell of the heat exchanger. As a result, the saline water that flows out of the heat exchanger is concentrated and collects in sump 28 located below the tubes as indicated in FIG. 2.

As shown, water vapor produced by the evaporation of saline water in the shell of effect 24 is applied, preferably, to second effect 29 of the evaporator which contains indirect contact heat exchanger in the form of a plurality of tube bundles whose tubes are diagramatically indicated by reference numeral 30. The water vapor produced from the saline water in the previous stage of the evaporator flows inside tubes 30, and saline water flows as a thin film on the outside of these tubes. As a result, the water vapor inside the tubes is condensed into fresh water which flows into conduit 31 joining the fresh water flowing in conduit 27. In this effect also, the condensation of water vapor inside the tubes causes the evaporation of water from the saline water in the shell side of the effect. The water vapor so produced by this effect is applied to condenser 22, and specifically to both stages of the condenser; and the warmed and more concentrated brine in the shell of this effect collects in sump 32. This sump supplies saline water to the shell of preceding effect 24 of the evaporator as indicated.

Figure 2A:
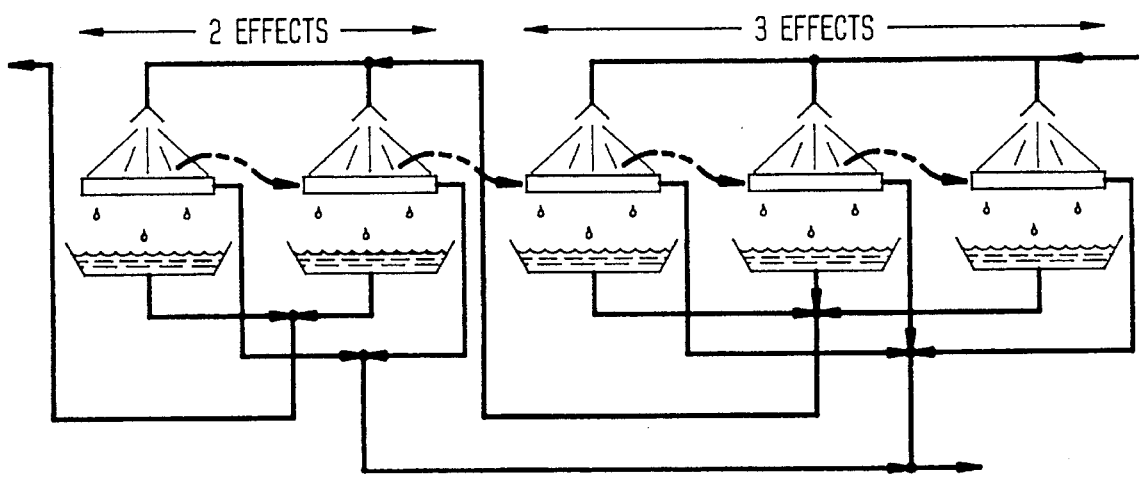
FIG. 2A is a schematic diagram of a preferred way to construct a multi-effect desalination plant according to the present invention.
Figure 2B:
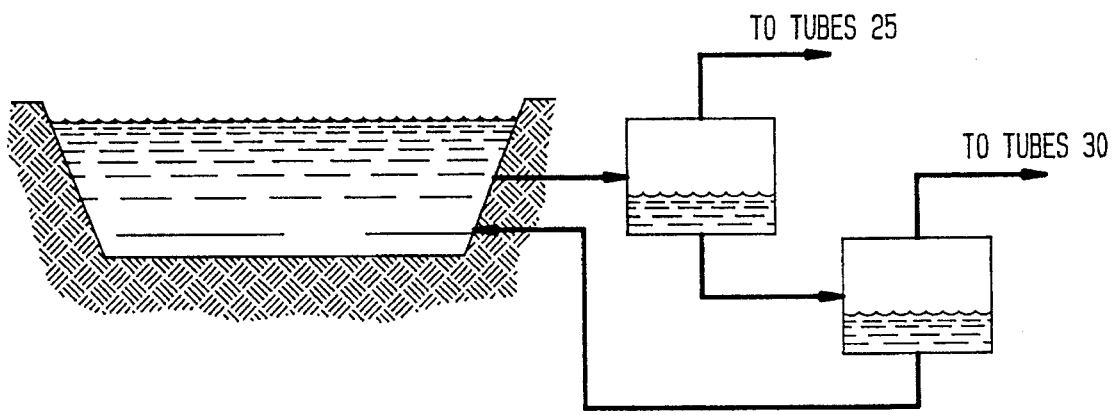
FIG. 2B is a schematic diagram of a an alternative construction showing serial flash chambers associated with a solar pond.

While two effects of the evaporator are illustrated in FIG. 2, it should be understood that many stages can be provided. In addition, few or several effects can be combined into a group of effects as shown in FIG. 2A. In each case, water vapor from the saline water applied to the outside of the tubes of a preceding effect in the evaporator is applied to the inside of the tubes of a succeeding effect. Furthermore, the saline water used to cool a downstream effect provides the saline water to cool the adjacent upstream effect. In addition, it should be understood that that, while two or more evaporator effects are shown and described, a single evaporator can also be used. In such case, saline or heated sea water exiting a condenser stage would be applied to the outside of the tubes in the evaporator to condense water vapor from the flash chamber applied to the inside of the tubes.

Condenser 22 includes primary stage 33 which includes heat exchanger tube bundles indicated schematically by tube 34, located in a closed shell, and stage 36 which includes heat exchanger tube bundles indicated schematically by tube 37, located in a closed shell. Water vapor from effect 29 of the evaporator is applied into the inside of tube 34 and to the outside of tube 37. Saline feed water applied to the shell of stage 33 of the condenser flows as a thin film over the tubes of this stage producing warmed saline water in sump 26 as the water vapor flowing inside the tubes condenses. The condensed water produced by condenser stage 33 flows in conduit 35 as desalted water joining the desalted water flowing in conduits 27 and 31. The heat of condensation of the water vapor inside the tubes is absorbed by the saline feed water which is sprayed on the outside of tube 34 and flows as a thin film thereover. Thus, stage 33 of the condenser can be considered to function as a preheater because the saline water in this stage of the condenser is not evaporated, and is only heated without changing the concentration of the saline water. This is to be distinguished from the operation on the saline water from sump 26 carried out in the various effects wherein the concentration of the water applied to the shell portions of the effects increases from effect to effect accompanied by a transfer of latent heat by the partial evaporation of the saline water in the shell portions of the effects.

The major portion of water vapor produced by the last effect of the evaporator is conveyed to the shell portion of stage 36 of the condenser and flows on the outside of tubes 37 which receive cooling water from wind mixed layer 14 of solar pond 12. After passing through tubes 37, the water from the wind mixed layer may be returned to the solar pond.

The brine in sump 28 will be the warmest brine in the system, and will also be the most concentrated brine present in the evaporator effects. Consequently, it is ideally suited, from both salinity and temperature, to be added to the heat storage layer of the pond to maintain the volume balance of the pond. The connection at node 40 effects this transfer of brine from sump 28 to the heat storage layer.

In a representative design, 10,000 metric tons of fresh water can be produced daily with system as indicated in FIG. 1 using a multi-effect evaporator. Sufficient brine is exchanged between the flash chamber and the heat storage layer to produce about a 1,000 metric tons of steam per day, the balance of the fresh water being supplied from the sea water used to cool the desalination plant. Thus, evaporator 20 and condenser 36 will produce an additional 9,000 metric tons of fresh water per day based on a throughput of 20,000 metric tons of sea water per day.

As shown in FIG. 2, only a single pump is needed to transfer water from the wind-mixed layer to the condenser, and to transfer water from the condenser back to the pond. This is made possible by arranging for the water to flow inside the tubes of stage 37 of the condenser, rather than in the shell of this stage.

Usually, the cross-sectional shape of the tubes is round. However, to increase the efficiency of the heat exchange process carried out in the various effects of the evaporator and the condenser, the tubes of the heat exchangers preferably should be elliptical or oval in cross-section as indicated diagramatically in FIG. 2. This arrangement, where the major axis is vertically disposed, results in minimizing the film thickness of the coolant flowing on the outside of the tube and thus increases the efficiency of heat transfer.

While the apparatus described above is concerned with desalination, the evaporator and condenser can be utilized for concentrating solutions other than sea water. In such case, the material of the tubes of the evaporator must be consistent with the type of solution involved. Aluminum, its alloys, and plastics are desired materials when concentrating sea water, but stainless steel or titanium may be necessary for other applications, particularly when high temperatures are involved. In severely polluted sea water, or saline water polluted with heavy metal ions such as iron or copper, distillation can be achieved by using copper alloy tubes for the heat exchangers.

Plastic tubes may be considered for use in the evaporator effects with suitable design because the inside pressure in these tubes is always higher than the outside pressure on the tubes.

Generally speaking, the heat contained in a solar pond will be most economically used as heat rather than being converted into electricity. However, in installations that are remote from power sources, the pond itself can be used to generate sufficient electricity to power all the appurtenances of the desalination plant.

The advantages and improved results furnished by the method and apparatus of the present invention are apparent from the foregoing description of the preferred embodiment of the invention. Various changes and modifications may be made without departing from the spirit and scope for the invention as described in the appended claims.

We claim:

1. A method for producing desalted water using steam and saline water comprising the steps of:
    a) condensing said steam for producing desalted water using an evaporator which is cooled by saline water which is heated as a result producing additional water vapor and warmed brine;
    b) condensing said additional water vapor for producing additional desalted water using a two-stage condenser to which the additional water vapor is applied in parallel, the first stage of the condenser being cooled by saline feed water which is heated as a result producing warmed saline feed water that constitutes the saline water that cools the evaporator, and the second stage being cooled by cooling water for producing warmed cooling water; and
    c) disposing of said warmed cooling water produced by the second stage and the warmed brine produced by said evaporator.

2. A method according to claim 1 wherein said steam is derived by flashing brine from the heat storage layer of a solar pond that includes a halocline interposed between a convective upper wind mixed layer exposed to the ambient atmosphere, and a lower heat storage layer of hot concentrated brine.

3. A method-according to claim 2 wherein the saline water used to cool the first stage of the condenser is sea water.

4. A method according to claim 2 wherein the cooling water used to cool the second stage of the condenser is drawn from the wind-mixed layer of the solar pond.

5. A method according to claim 4 wherein some of the warmed cooling water is returned to the wind-mixed layer of the solar pond.

6. A method according to claim 5 wherein saline water is supplied to the wind-mixed layer of the solar pond as make-up water.

7. Apparatus for producing desalted water using steam and saline water in combination with a solar pond that includes a halocline interposed between a convective upper wind mixed layer exposed to the ambient atmosphere, and a lower heat storage layer of hot concentrated brine, and including:
    (a) a flash chamber;
    (b) means for exchanging brine in said heat storage layer with said flash chamber for producing steam
    (c) a source of saline feed water;
    (d) a first evaporator effect responsive to said steam and to feed water from said source for condensing said steam to produce desalted water and for evaporating water from the last mentioned feed water to produce additional water vapor and to concentrate the remaining feed water;
    (e) a second evaporator effect responsive to said additional water vapor and to feed water from said source for condensing said additional water vapor to produce desalted water and for evaporating water from the last mentioned feed water to produce additional water vapor and to concentrate the remaining feed water; and
    (f) means for supplying the feed water concentrated by said second evaporator effect to said first evaporator effect.

8. Apparatus according to claim 7 including means for supplying the feed water concentrated by said first effect to the heat storage layer of the solar pond.

9. Apparatus according to claim 7 including a condenser for condensing said additional water produced by said second evaporator.

10. Apparatus according to claim 9 wherein said condenser is cooled by a source of saline water which is then applied to an effect in the evaporator.

11. Apparatus according to claim 7 including means for returning said remaining feed water to the heat storage layer of the solar pond.

12. A method for producing desalted water from a source of saline feed water by utilizing a salt water solar pond that includes a halocline interposed between heat storage layer and an upper wind-mixed layer exposed to the ambient atmosphere, said method comprising the steps of:
    (a) flashing hot brine from the heat storage layer of a salt-water solar pond into steam to provide a source of water vapor;
    (b) providing a plurality of evaporator effects arranged in succeeding fashion, the first being responsive to water vapor from said source of water vapor and to feed water from a source of feed water for condensing said water vapor to produce desalted water and for evaporating water from the last mentioned feed water to produce additional water vapor and to concentrate the remaining feed water;

(c) supplying the feed water concentrated by a succeeding effect to the preceding effect whereby the supplied feed water constitutes the source thereof for the preceding effect; and (d) supplying the additional water vapor produced by a preceding effect to the succeeding effect whereby the supplied additional water vapor constitutes the source thereof for the succeeding effect.

13. A method according to claim 12 including supplying the feed water concentrated by said first effect to the heat storage layer of the solar pond.

14. A method according to claim 12 including condensing the additional water vapor produced by the last effect for producing desalted water by using a source of saline feed water to produced warmed feed water, and supplying the warmed feed water to the last effect whereby the supplied warmed feed water constitutes the source of feed water for the last effect.

15. A method according to claim 14 wherein sea water is the source of saline water used to condense said additional water vapor produced by the last effect.

16. A method according to claim 14 wherein water from the wind-mixed layer of saline the solar pond is used to condense said additional water vapor produced by the last effect.

17. A method according to claim 14 wherein some of the warmed cooling water is returned to the wind-mixed layer of the solar pond.

18. A method according to claim 17 wherein saline water is supplied to the wind-mixed layer of the solar pond as make-up water.

19. A method according to claim 14 wherein the step of condensing the additional water vapor produced by the last effect utilizes a two-stage condenser to which the additional water vapor is applied in parallel, the first stage being cooled by saline feed water producing warmed feed water which is supplied to the last effect whereby the supplied warmed feed water constitutes the source of feed water for the last effect, and the second stage being cooled by cooling water producing warmed cooling water.

20. A method according to claim 19 wherein sea water is the source of saline water used for cooling the first stage of the two stage condenser.

21. A method according to claim 19 wherein water from the wind mixed layer of the solar pond is used for cooling the second stage of the two stage condenser.

22. Apparatus for producing desalted water comprising:
(a) a source of saline feed water;
(b) a source of water vapor;
(c) a plurality of evaporator effects arranged in succeeding fashion, each of which is responsive to water vapor for condensing the same to produce desalted water, and to feed water for evaporating the same to produce additional water vapor and more concentrated feed water;
(d) means for applying said source of water vapor to the first of said evaporator effects;
(e) means for applying the additional water vapor produced by a preceding effect to a succeeding effect whereby the supplied additional water vapor constitutes the source thereof for the succeeding effect;
(f) means for supplying the feed water concentrated by a succeeding effect to the preceding effect whereby the supplied feed water constitutes the source thereof for the preceding effect;
(g) means for disposing of the remaining feed water from the first effect;
(h) means for supplying said source of feed water to the last of said effects; and
(i) wherein said means for supplying said source of feed water to the last of said effects includes a multi-stage condenser that is cooled by feed water from said source of feed water for producing said warmed feed water, means for supplying said warmed feed water to the last effect, and means for supplying the additional water vapor produced by the last effect in parallel to the stages of said condenser.

23. Apparatus according to claim 22 including a source of cooling water, and wherein said condenser includes a first stage cooled by the feed water from said source of feed water for producing said warmed feedwater, and a second stage cooled by said cooling water for producing warmed cooling water.

24. Apparatus according to claim 23 including means for cooling said warmed cooling water.

25. Apparatus according to claim 24 wherein said source of cooling water is a ponds exposed to ambient air.

26. Apparatus according to claim 25 including a salt water solar pond having a wind-mixed layer at the surface, and wherein said source of cooling water is said wind mixed-layer.

* * * * *